April 20, 1954

R. C. CORDERMAN

PHASE MODULATION

Filed Feb. 19, 1951

2,676,303

INVENTOR
R. C. CORDERMAN
BY H. A. Burgess
ATTORNEY

Patented Apr. 20, 1954

2,676,303

UNITED STATES PATENT OFFICE 2,676,303

PHASE MODULATION

Roy C. Corderman, Winston-Salem, N. C., assignor to Western Electric Company, Incorporated, New York, N. Y., a corporation of New York Application February 19, 1951, Serial No. 211,734

5 Claims. (Cl. 332—28)

This invention relates to signal modulation and more particularly to phase modulation.

It is an object of the invention to augment the phase shift per unit of modulating signal amplitude obtained with a phase modulator.

In accordance with a specific embodiment of the invention disclosed in detail below for purposes of illustration, the phase of a radio frequency wave from a stabilized source is modulated in a conventional manner by an input signal. A portion of the phase modulated wave is then fed back to the input of the phase modulator and combined with the wave from the stabilized source so that the phase of the radio frequency waves supplied to the modulator is varied in proportion to the instantaneous phase modulation. The net result is that the resultant phase shift per unit of modulating signal amplitude is increased. The circuit is a positive feedback arrangement so that care is taken to properly limit the feedback voltage to prevent instability. The phase shift of the modulated waves due to the feedback is smaller than the initial phase shift due to the modulating signal so that the action is convergent in nature. For example, in the case of a stepped input signal, the output wave will seek stable phase displacements.

Figure 1:
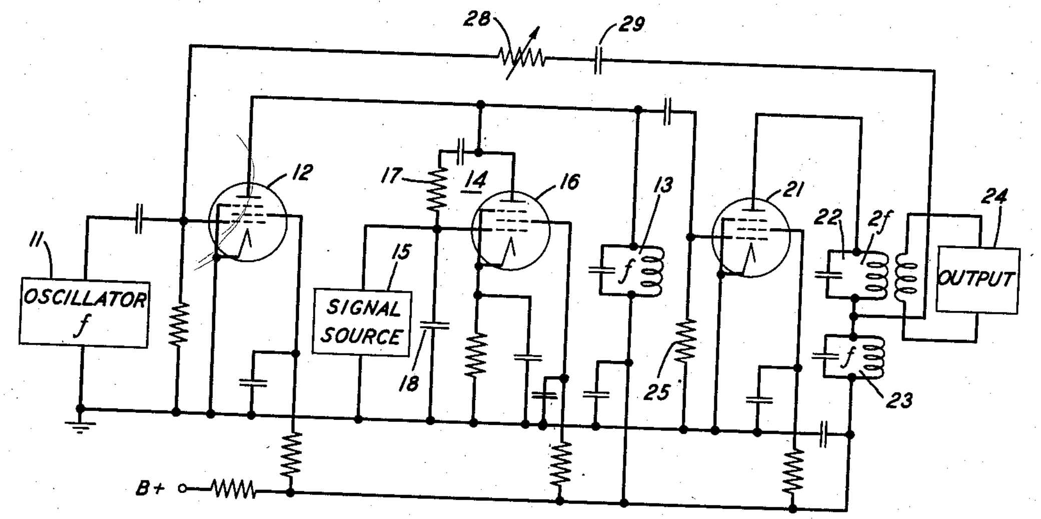

The invention, its features and objects may be better understood from a consideration of the following detailed description when read in accordance with the attached drawings in which:

Fig. 1 shows schematically a phase modulation circuit embodying principles of the present invention; and Figs. 2, 3, 4, and 5 are vector diagrams illustrating voltages at various points in the circuit at Fig. 1.

Referring now to Fig. 1 radio frequency waves to be modulated are supplied from a stabilized oscillator 11 which may, for example, comprise a crystal oscillator of well-known type to the input of a first amplifier 12. The amplifier 12 comprises a conventional pentode having a tuned plate load 13 which is tuned to resonance at the frequency of the waves from the source 11. Biases are supplied in a conventional manner. Shunted across the plate load 13 is a phase modulator comprising a reactance tube 14 to which are fed modulating voltages from a signal source 15. The reactance tube 14 is a conventional circuit and comprises a pentode 16 whose plate-cathode circuit is in shunt with the tuned plate circuit 13 of the amplifier 12. Resistor 17 and condenser 18 comprise a phase splitter which feeds to the control grid of the pentode 16 a voltage which is 90 degrees out of phase with the voltage across the tuned circuit 13. The reactance tube 14 acts as a variable reactance whose value is dependent upon the instantaneous amplitude of the voltage supplied by the signal source 15. Being shunted across the tuned circuit 13, it acts to detune circuit 13 in accordance with the modulating signal amplitude and hence shifts the phase of the amplified waves from oscillator 11 which appear in the output circuit of amplifier 12. Reactance tube phase modulators are well known and are described for example in the "Radio Engineer's Handbook" by F. E. Terman, McGraw Hill 1943, at pages 585 and 654 and 655. The radio frequency waves now shifted in phase in accordance with the modulating signals are next applied to amplifier 21 which has a plate load circuit including the two tuned circuits 22 and 23. The parallel tuned circuit 22 is tuned to resonance at a frequency which is twice the frequency of the waves supplied by oscillator 11 while resonant circuit 23 is tuned to the fundamental. An output circuit 24 is inductively coupled to the resonant circuit 22 which is tuned to the double frequency. Frequency doubling aids in the production of a large modulation index as is well known. In addition to operating as a frequency doubling amplifier, tube 21 also acts as a limiter by virtue of the grid leak resistor 25. Grid leak limiter circuits are well known and by proper proportioning of the circuit constants associated with tube 21 both positive and negative limiting may be obtained at desired values.

A feedback circuit comprising the variable resistor 28 and condenser 29 applies a portion of the phase modulated voltage of the fundamental frequency appearing across tuned circuit 23 to the control grid of amplifier 12. Since the arrangement comprises an even number of stages the feedback is positive in nature so that care must be taken by adjusting resistor 28, for example, to limit the maximum amplitude of the feedback voltage to prevent instability. The feedback voltage combines vectorially with the waves supplied by the oscillator 11 and thus modifies the phase of the voltage supplied to the modulator in accordance with the instantaneous phase modulation.

Figure 2:
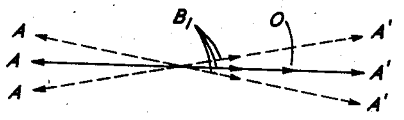

The operation of the circuit may be better understood by referring to the vector diagrams, Figs. 2 through 5. Referring to Fig. 2, vector O represents the input voltage to tube 12 supplied by the stabilized oscillator 11. Vectors A represent the amplified voltage appearing at the output of tube 12 with a 180-degree phase shift due to the operation of the amplifier and with a further phase shift, plus or minus, resulting from the modulating potential; the dotted vectors illustrate the range of the phase shift resulting from a given input signal. The vectors A' represent the amplified phase modulated voltages appearing at the output of amplifier 21. The vectors $B_1$ which are merely a portion of the larger vectors A' represent the initial feedback voltage which is fed back to the input of tube 12.

Figure 3:
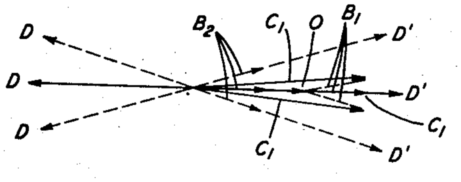

The vectors of Fig. 3 illustrate the second step in the operational analysis. The voltage O from the oscillator is now combined with the modulated feedback voltage $B_1$ to form a resultant voltage $C_1$; this resultant voltage is applied to the input of tube 12. It may not be readily observed that the length of vectors $C_1$ vary in length, but this is true as it is obvious that the addition of vector O with vector $B_1$ in the modulated condition is shorter than the addition of vector O with vector $B_1$ in the unmodulated or resting condition. Vectors D represent the amplified voltage $C_1$ appearing at the output of tube 12 which has further been shifted in phase by the modulating voltage supplied by the signal source 15. These voltages are further amplified by tube 21 and appear at the output of tube 21 as vectors D', the vectors $B_2$ now represent the feedback voltage.

Figure 4:
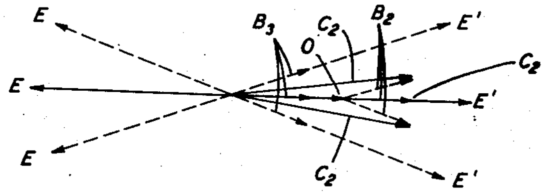

The vectors of Fig. 4 merely carry the analysis one step further. The initial voltage O is now combined with the feedback voltage $B_2$ to form the resultant $C_2$ and as amplified and further shifted in phase by the modulating potential appears across the tuned circuit 13 as vectors E. Vector E' and $B_3$ represent, respectively, the voltages appearing at the output of tube 21 and the feedback voltage.

Figure 5:
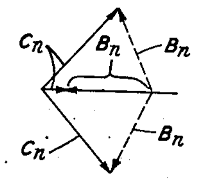

Fig. 5 illustrates the maximum condition which is permissible, namely the condition where the feedback voltage $B_n$ when added to the input voltage O generates a combined voltage $C_n$ which is equal to vector O. This limit cannot be fully reached as it is evident that the feedback voltage if greater than the original voltage would result in instability.

In the foregoing discussion of the vector diagrams, it has been represented that successive cycles of modulation in the first vacuum tube 12 and amplification in the final tube 21 occur. It should be understood, however, that these events occur substantially simultaneously, the successive changes in the character of the signal having been represented merely to aid in analyzing the over-all operation of the circuit.

The maximum phase displacement obtainable with the circuit of Fig. 1 is equal to one radian or approximately 57 degrees. This is five times the 11 degree shift which is ordinarily considered the maximum permissible in a phase modulated tube, and hence, reduces by a factor of 5 the multiplication stages ordinarily necessary to obtain a comparable phase shift.

It will be noted that by virtue of the limiting action provided by tube 21 and the associated feedback, distortion normally present in phase modulated systems when operating at high levels of modulation is eliminated as the limiting action removes amplitude products of modulation.

Therefore, the lengths of the vectors D' and E' under the modulated and unmodulated conditions will be substantially the same. By a proper adjustment of the limiting action of tube 21 the output phase displacement of the modulating signal may be made substantially linear with respect to the applied modulating signal.

Although the invention has been described as relating to a specific embodiment, numerous other embodiments and modifications will readily occur to one skilled in the art so that the invention should not be deemed limited to the specific embodiment enclosed.

What is claimed is:

1. A regenerative phase modulation circuit comprising a source of waves to be modulated, a first amplifier, means to apply said waves to be modulated to the input of said first amplifier, a source of modulating signals, means connected in the output of said first amplifier for modulating the phase of said waves in accordance with said signals, a second amplifier, means to apply the phase shifted waves to the input of said second amplifier, an output circuit connected to the output of said second amplifier, and a feedback circuit to apply a portion of the output of said second amplifier to the input of said first amplifier.

2. The combination in accordance with claim 1 wherein said second amplifier includes limiter means for limiting the output of the second amplifier.

3. A modulation circuit comprising a source of waves to be modulated, a source of modulating signals, a phase modulator, means for applying said waves and said signals to said modulator, and means for combining a portion of the output of said modulator with the said waves applied to said modulator comprising a feedback circuit connected between the output of said modulator and said means for applying said waves to said modulator.

4. A phase modulation circuit comprising a stabilized source of radio frequency waves, a first amplifier having an output circuit including a circuit tuned to resonance at the frequency of said waves, means to apply said radio frequency waves to the input of said first amplifier, a reactance tube modulator connected in shunt with said tuned circuit, means to apply modulating signal waves to said reactance tube, a second amplifier means to apply the output of said first amplifier to the input of said second amplifier, an output circuit connected to the output of said second amplifier, and means to apply a portion of the output of said second amplifier to the input of said first amplifier.

5. The combination in accordance with claim 4 wherein said last-named means comprise variable resistance means.

References Cited in the file of this patent

UNITED STATES PATENTS

| Number | Name | Date |
|---|---|---|
| 2,279,660 | Crosby | Apr. 14, 1942 |
| 2,436,834 | Stodola | Mar. 2, 1948 |
| 2,504,050 | Rohde | Apr. 11, 1950 |
| 2,566,405 | DeLange et al. | Sept. 4, 1951 |
| 2,598,722 | Richards | June 3, 1952 |